(12) United States Patent
Anthony

(10) Patent No.: US 9,190,892 B2
(45) Date of Patent: Nov. 17, 2015

(54) ELECTRO-MAGNETIC COUPLING SYSTEM

(71) Applicant: ROLLS-ROYCE PLC, London (GB)

(72) Inventor: John Edward Anthony, Derby (GB)

(73) Assignee: ROLLS-ROYCE PLC, London (GB)

( * ) Notice: Subject to any disclaimer, the term of this patent is extended or adjusted under 35 U.S.C. 154(b) by 493 days.

(21) Appl. No.: 13/847,739

(22) Filed: Mar. 20, 2013

(65) Prior Publication Data

US 2014/0328668 A1    Nov. 6, 2014

(30) Foreign Application Priority Data

May 3, 2012    (GB) .................................. 1207754.1

(51) Int. Cl.
| | |
|---|---|
| *H02K 49/10* | (2006.01) |
| *H02K 99/00* | (2014.01) |
| *F02C 7/36* | (2006.01) |
| *F02C 3/107* | (2006.01) |
| *H02K 21/14* | (2006.01) |
| *H02K 21/40* | (2006.01) |

(52) U.S. Cl.
CPC .............. *H02K 49/102* (2013.01); *F02C 3/107* (2013.01); *F02C 7/36* (2013.01); *H02K 21/14* (2013.01); *H02K 21/40* (2013.01); *H02K 57/003* (2013.01); *F05D 2240/00* (2013.01); *F05D 2260/404* (2013.01); *Y02T 50/671* (2013.01)

(58) Field of Classification Search
CPC ... H02K 49/102; H02K 57/003; H02K 21/14; H02K 21/40; F02C 3/107; F02C 7/36; F05D 2240/00; F05D 2260/404; Y02T 50/671
USPC .............. 415/10, 83–87, 122.1; 310/103, 114
See application file for complete search history.

(56) References Cited

U.S. PATENT DOCUMENTS

| | | | |
|---|---|---|---|
| 8,446,060 B1 * | 5/2013 | Lugg ........................ | 310/156.22 |
| 8,464,511 B1 * | 6/2013 | Ribarov et al. ............. | 60/226.1 |
| 2010/0127496 A1 * | 5/2010 | Burkholder et al. ............ | 290/46 |

FOREIGN PATENT DOCUMENTS

EP         1 936 238 A2    6/2008

OTHER PUBLICATIONS

Sep. 3, 2012 British Search Report issued in British Application No. GB1207754.1.

* cited by examiner

*Primary Examiner* — Hoang Nguyen
(74) *Attorney, Agent, or Firm* — Oliff PLC

(57) ABSTRACT

An electro-magnetic coupling system for transferring torque between a pair of coaxial spools of a gas turbine engine is provided. The system includes a first rotor rotatable with one of the spools, a second rotor rotatable with the other of the spools, and a stator. The first and second rotors and the stator are coaxial with each other. The second rotor operably couples the first rotor and the stator. The first rotor carries a plurality of magnetic flux-producing formations which produce a first magnetic field. The stator carries a plurality of electrical winding coils which are energisable to generate a second magnetic field. The second rotor carries an arrangement of interpoles which modulate the first and second magnetic fields such that the modulated fields interact to transfer torque between the spools.

17 Claims, 2 Drawing Sheets

ELECTRO-MAGNETIC COUPLING SYSTEM

FIELD OF THE INVENTION

The present invention relates to an electro-magnetic coupling system for transferring torque between, or generating electrical power from, a pair of coaxial spools of a gas turbine engine.

BACKGROUND OF THE INVENTION

A gas turbine engine may have a plurality of coaxial spools. For example, an aero gas turbine engine can have a low pressure spool formed by a propulsive fan, low pressure turbine and respective interconnecting shaft, and a high pressure spool formed by a high pressure compressor, high pressure turbine and respective interconnecting shaft, the shaft of the low pressure spool extending through the shaft of the high pressure spool. Some engines also have an intermediate pressure spool formed by an intermediate pressure compressor, intermediate pressure turbine and respective interconnecting shaft. Each fan or compressor is driven by the respective turbine. The compressor(s) forces compressed air into a combustor, where the air is mixed with fuel and ignited to produce a flow of hot combustion gas from which the turbines extract energy.

At particular points in a typical aircraft flight cycle the engine operability and/or efficiency may be improved by the transfer of mechanical power from one spool to another. The required direction and magnitude of the power transfer depends on the engine design and flight cycle conditions.

This power transfer can be achieved by mechanical gearing, but this brings associated problems of weight, reliability and operational flexibility. U.S. Pat. No. 7,791,235 proposes a variable magnetic coupling for transferring torque between the shafts of an aero gas turbine engine.

As well as providing thrust for powering the flight of the aircraft, an aero gas turbine engine generally also has to power an electrical generator for the aircraft's electrical power systems, and to provide mechanical power for a number of accessories such as fuel and oil pumps. It is thus usual to extract power for such accessories from the engine's high pressure spool (or sometimes the intermediate pressure spool) via a gearing and drive shaft arrangement. An advantage of using the high pressure spool for this purpose is that the relatively narrow rotational speed range of the spool is compatible with the operational requirements of electrical generators.

Increased demand for extracted power for accessories can cause problems for engine operability when an engine is operating at or near idle, for example at top of descent or hold.

One option is to extract a fraction of the power from a lower pressure spool, but the wider rotational speed range of such a spool may not be compatible with the requirements of electrical power generation, and furthermore a fixed gear ratio between the spool and its associated generator results in the mass of the generator being significantly increased by the wider speed range of the lower speed spool(s).

SUMMARY OF THE INVENTION

There is a need for improved systems for transferring torque between the spools of a gas turbine engine.

Accordingly, in a first aspect, the present invention provides an electro-magnetic coupling system for transferring torque between a pair of coaxial spools of a gas turbine engine, the system including a first rotor rotatable with one of the spools, a second rotor rotatable with the other of the spools, and a stator, the first and second rotors and the stator being coaxial with each other, and the second rotor operably coupling the first rotor and the stator;

wherein:
the first rotor carries a plurality of magnetic flux-producing formations which produce a first magnetic field,
the stator carries a plurality of electrical winding coils which are energisable to generate a second magnetic field, and
the second rotor carries an arrangement of interpoles which modulate the first and second magnetic fields such that the modulated fields interact to transfer torque between the spools.

Advantageously, such a coupling system can be compactly formed, making it suitable for installation in the typically limited space available in an aero gas turbine engine. Further, generating the second magnetic field using the electrical winding coils of the stator allows the system to have a relatively high power density.

The coupling system of the first aspect may have any one or, to the extent that they are compatible, any combination of the following optional features.

The electrical winding coils of the stator may be de-energisable to remove the second magnetic field. Further, the system may be configured such that, in the absence of the second magnetic field, there is no torque transfer between the spools. Thus, the stator typically generates the second magnetic field using only the electrical winding coils (i.e. without recourse to permanent magnets on the stator). In this way, torque transfer can be engaged or disengaged as desired, for example at specific points in a flight cycle where the engine is at or near idle.

The system may further have a power electronic converter which controls the energising current waveform through the electrical winding coils of the stator.

In gas turbine engines it is usual for the speed ratio between spools to be relatively constant across multiple operating conditions where power transfer between spools is desirable. Thus, when the second rotor has a substantially constant speed ratio relative to the first rotor during predetermined operating conditions of the engine, the number of magnetic flux-producing formations of the first rotor and the number of interpoles of the second rotor can be selected such that, at the constant speed ratio, the electrical power flow through the electrical winding coils of the stator is zero. Alternatively, when the second rotor has a substantially constant speed ratio relative to the first rotor during predetermined operating conditions of the engine, the number of magnetic flux-producing formations of the first rotor and the number of interpoles of the second rotor can be selected such that, at the constant speed ratio, the electrical power flow through the electrical winding coils of the stator is minimized. In this case, however, preferably the minimized electrical power flow is out of the system, such that the system can act as an electrical generator, which may then be able to export power to the wider engine or aircraft. For an aero engine, the predetermined operating conditions can be top of descent and hold.

Indeed, more generally, a single system that can extract power from multiple engine spools simultaneously, and preferably without suffering from inherent issues associated with the wide speed ranges typical of lower speed spools, can be advantageous.

Thus, in a second aspect, the present invention provides an electro-magnetic coupling system for generating electrical power from a pair of coaxial spools of a gas turbine engine, the system including a first rotor rotatable with one of the spools, a second rotor rotatable with the other of the spools, and a stator, the first and second rotors and the stator being coaxial with each other, and the second rotor operably coupling the first rotor and the stator;

wherein:

the first rotor carries a plurality of magnetic flux-producing formations which produce a magnetic field, the second rotor carries an arrangement of interpoles which modulate the magnetic field, and the stator carries a plurality of electrical winding coils which are arranged to transduce the modulated magnetic field into electrical energy.

The system of the second aspect may further have a power electronic converter which controls the current waveform generated in the electrical winding coils by the transduction of the modulated magnetic field.

A third aspect of the present invention provides a gas turbine engine having a pair of coaxial spools, the engine further having a system according to the first or second aspect.

A fourth aspect of the present invention provides a gas turbine engine having a pair of coaxial spools, the engine further having an electro-magnetic coupling system for transferring torque between the spools according to the first aspect, and the engine also having an electro-magnetic coupling system for generating electrical power from the spools according to the second aspect.

A fifth aspect of the present invention provides the use of the coupling system of the first aspect to transfer torque between a pair of coaxial spools of a gas turbine engine.

A sixth aspect of the present invention provides the use of the coupling system of the second aspect to generate electrical power from a pair of coaxial spools of a gas turbine engine.

The engine of any one of the third to sixth aspects may have any one or, to the extent that they are compatible, any combination of the following optional features.

The engine may be a two spool engine having a high pressure spool and a low pressure spool, the or each first rotor being rotatable with one of the high pressure spool and the low pressure spool, and the or each second rotor being rotatable with the other of the high pressure spool and the low pressure spool. Alternatively, the engine may be a three spool engine having a high pressure spool, an intermediate pressure spool and a low pressure spool. One option is then for the or each first rotor to be rotatable with one of the high pressure spool and the intermediate pressure spool, and the or each second rotor to be rotatable with the other of the high pressure spool and the intermediate pressure spool. Another option, however, is for the or each first rotor to be rotatable with one of the intermediate pressure spool and the low pressure spool, and the or each second rotor to be rotatable with the other of the intermediate pressure spool and the low pressure spool.

The gas turbine engine may be an aero engine.

More optional features of the invention will now be set out. These are applicable singly or in any combination with any aspect of the invention.

The spools may be co-rotating or contra-rotating.

Conveniently, the magnetic flux-producing formations of the first rotor may be permanent magnets. Another option, however, is for the magnetic flux-producing formations of the first rotor to be further electrical winding coils. For example, the first rotor can be a salient or non-salient rotor with DC winding coils. Current to such a rotor can be supplied by sliprings or a brushless exciter. Such an arrangement allows the first rotor excitation to be controlled in a similar manner to wound field synchronous machines, whereby output voltage control can be implemented.

The first rotor may be radially spaced from the stator, and the second rotor may be radially located between the first rotor and the stator. For example, the stator may be radially outward of the first rotor.

Alternatively, however, first rotor may be axially spaced from the stator, and the second rotor may be axially located between the first rotor and the stator.

Further optional features of the invention are set out below.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES OF THE INVENTION

Figure 1:
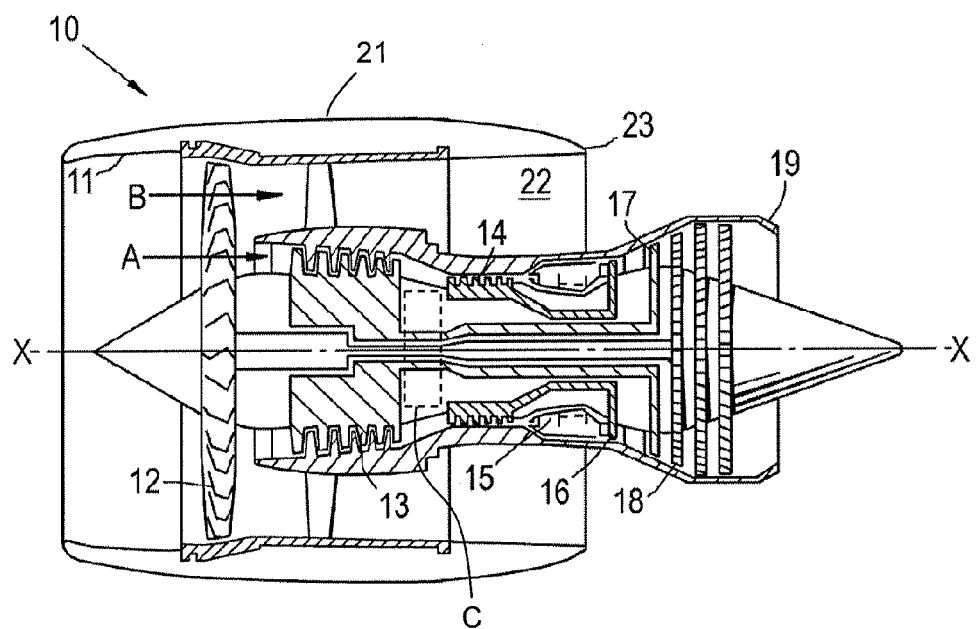
FIG. 1 shows a longitudinal cross-section through a ducted fan gas turbine engine.

With reference to FIG. 1, a ducted fan gas turbine engine incorporating the invention is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, and intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

The propulsive fan 12, low-pressure turbine 18 and respective interconnecting shaft form the low-pressure spool; the intermediate-pressure compressor 13, intermediate-pressure turbine 17 and respective interconnecting shaft form the intermediate-pressure spool; and the high-pressure compressor 14, high-pressure turbine 16 and respective interconnecting shaft form the high-pressure spool.

Although not shown in FIG. 1, the engine 10 has a gearing and drive shaft arrangement for extracting power from the high-pressure spool. For example, a radial drive shaft located at bottom dead centre of the engine can be driven by the high-pressure shaft via an internal gearbox. The radial drive shaft can in turn drive an angled drive shaft via a step-aside gearbox, the angled drive shaft terminating in an external accessory gearbox. In order to transfer power between the spools or to generate electrical power from both spools, the engine 10 also has an electro-magnetic coupling system for transferring torque between the intermediate-pressure spool and the high-pressure spool. As described in more detail below, the system can be conveniently located at the position indicated C, inside the main gas path, between the intermediate-pressure compressor 13 and the high-pressure compressor 14. However, it is helpful to describe first some of the principles of operation of the coupling system.

K. Atallah and D. Howe, *A Novel High-Performance Magnetic Gear*, IEEE Transactions on magnetics, vol. 37, No. 4, July 2001, pp. 2844-2846, describes a form of magnetic gear having a radially inner rotor carrying an arrangement of permanent magnets, a radially outer rotor carrying a further arrangement of permanent magnets, and an intermediate rotor carrying an arrangement of interpoles. The coupling system of the present invention differs from such a gear by replacing at least one of the arrangements of permanent magnets by electrical winding coils that can produce a rotating magnetic field (although, as will be discussed below, this magnetic field may in practice be stationary), i.e. in the same manner as the multiphase electrical windings of conventional electrical machines. Further, in the coupling system, these winding coils are carried by a stator, rather than by a rotor. The electrical winding, and hence the stator, can be radially inwardly or radially outwardly of the two remaining rotors.

Figure 2:
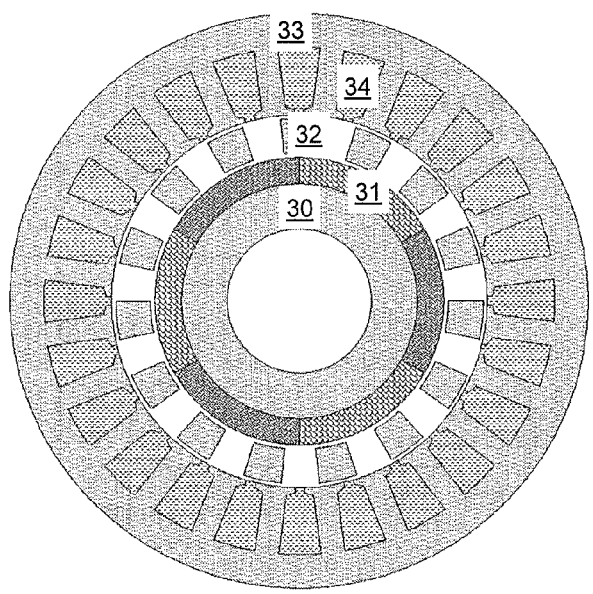
FIG. 2 shows a transverse cross-section through an embodiment of an electro-magnetic coupling system.
Figure 3:
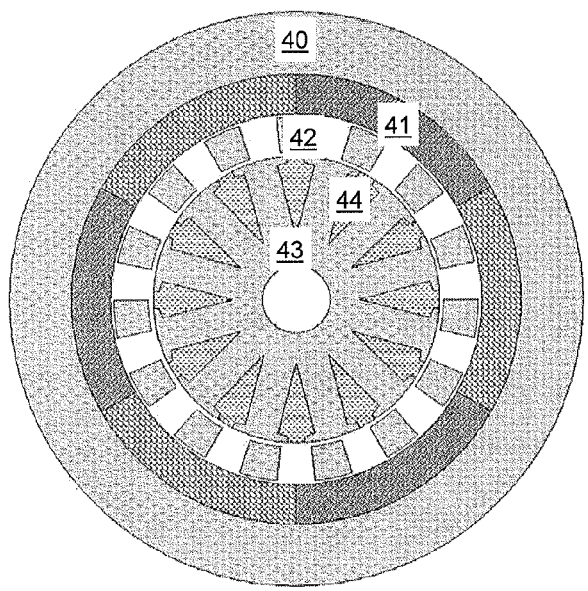
FIG. 3 shows a transverse cross-section through another embodiment of an electro-magnetic coupling system.

The winding can be any type that produces a rotating field, for example a distributed (lap or concentric) winding or a fractional slot (concentrated single layer or concentrated double layer) winding. With a fractional slot winding the working field harmonic is generally a multiple of the fundamental field harmonic. A fractional slot winding is useful in producing high pole number fields using relatively low slot numbers (in addition to providing other benefits of short end windings, such as improved manufacturability and improved slot fill factor due to the use of concentrated coils, i.e. coils with a span of just one slot), and hence is of particular interest in this machine where relatively high pole numbers may be required. FIG. 2 shows a transverse cross-section through an embodiment of the coupling system having a radially inner rotor 30 carrying permanent magnets 31 forming three pole pairs, an intermediate coupling rotor 32 carrying fifteen ferromagnetic interpoles, and a radially outer stator 33 having electrical winding coils 34 which form twelve pole pairs. FIG. 3 shows a transverse cross-section through another embodiment of the coupling system having a radially outer rotor 40 carrying permanent magnets 41 forming three pole pairs, an intermediate coupling rotor 42 carrying fifteen ferromagnetic interpoles, and a radially inner stator 43 having electrical winding coils 44 which form twelve pole pairs.

The coupling system provides 3-port power exchange, with two ports being mechanical power via rotatable shafts and the third port being electrical power via the stator winding. By suitable selection of the pole pair and interpole numbers, and by controlling either the electrical excitation (current waveform) of the stator winding, or the mechanical speed of one of the rotatable shafts, desirable power flows can be established and controlled.

We next describe the machine behaviour of such a coupling system. For generality, we use the terms "inner rotor" and "outer rotor", even though one of these rotors is actually a stator. More particularly, the "rotor" corresponding to the stator refers to the speed of rotation of the magnetic field of the stator. Similarly the "power" of that "rotor" refers to the electrical power transferred via the stator winding. Further, the following equations describing the machine behaviour are equally applicable for the two machine variants described previously, viz. the outer assembly being the stator carrying the electrical winding (FIG. 2), and the inner assembly being the stator carrying the electrical winding (FIG. 3).

Let $p_{inner}$ be the number of pole pairs of the inner rotor, $p_{outer}$ be the number of pole pairs of the outer rotor, and $\lambda$ be the number of ferromagnetic interpoles of the intermediate rotor.

According to the operation of the magnetic gear as described by K. Atallah and D. Howe (ibid.), the number of interpoles $\lambda$ must be set to either the sum or difference of $p_{inner}$ and $p_{outer}$. Preferably the sum is used, as this tends to produce better electromagnetic performance compared to the difference, due to reduced interpolar flux leakage. However, for some applications the constraints on rotor speeds and their rotational directions dictate that the difference is used. All of the following equations except for Equation 8 are valid for both interpole number variants. Equation 8 as shown is valid where the number of interpoles is set to the sum of $p_{inner}$ and $p_{outer}$. Where the difference is used then $\alpha$ should be replaced by $-\alpha$ in Equation 8. This change then flows down to the derivative equations listed in the appendix so that, in these equations, substitution of $\alpha$ for $-\alpha$ yields the appropriate form for embodiments where the number of interpoles is set to the difference of $p_{inner}$ and $p_{outer}$.

To aid with the machine description, two quantities are defined:

$$\alpha \equiv \frac{p_{outer}}{p_{inner}} \quad \text{Equation (1)}$$

$$\beta \equiv p_{inner} + p_{outer} \quad \text{Equation (2)}$$

Let $P_{inner}$ be the power (in Watts) of the inner rotor, $P_{interpole}$ be the power (in Watts) of the interpole rotor, and $P_{outer}$ be the power (in Watts) of the outer rotor. Let $\omega_{inner}$ be the rotational speed (in radians per second) of the inner rotor, $\omega_{interpole}$ be the rotational speed (in radians per second) of the interpole rotor, and $\omega_{outer}$ be the rotational speed (in radians per second) of the outer rotor. Let $T_{inner}$ be the electromagnetic torque (in Newton-meters) acting upon the inner rotor, $T_{interpole}$ be the electromagnetic torque (in Newton-meters) acting upon the interpole rotor, and $T_{outer}$ be the electromagnetic torque (in Newton-meters) acting upon the outer rotor.

The macroscopic behaviour of the machine can be described completely by six equations:

$$P_{inner} = T_{inner}\omega_{inner} \quad \text{Equation (3)}$$

$$P_{interpole} = T_{interpole}\omega_{interpole} \quad \text{Equation (4)}$$

$$P_{outer} = T_{outer}\omega_{interpole} \quad \text{Equation (5)}$$

$$T_{inner} + T_{interpole} + T_{outer} = 0 \quad \text{Equation (6)}$$

$$P_{inner} + P_{interpole} + P_{outer} = 0 \quad \text{Equation (7)}$$

$$\omega_{inner} + \alpha\omega_{outer} = (1+\alpha)\omega_{interpole} \quad \text{Equation (8)}$$

The above equations can be combined and arranged in different ways to obtain relationships between shaft torques, speeds and powers; these are all strongly coupled in the machine, restricting the achievable operating states. The Appendix provides a list of equations relating rotor speed, power and torque, which have been derived from the above equations.

However, because of the restriction on achievable operating states, it can be desirable to implement a design procedure for each application to determine the most suitable pole pair and interpole numbers.

We describe next an embodiment of the coupling system for transferring torque between a pair of spools of a gas turbine engine, and an associated design procedure. In this application the system is used to transfer power between low-pressure and high-pressure spools in a 2-shaft gas turbine, or between low-pressure and intermediate-pressure spools or between intermediate-pressure and high-pressure spools in a 3-shaft gas turbine. The spools may be co-rotating or contra-rotating.

In such an engine, power transfer is usually only desirable at certain specific points in the flight cycle, such as top of descent and hold. For the remainder of the flight cycle it is not desirable for there to be any power transmission between spools. Typically it is desired to transfer power to the high-pressure spool.

Figure 4:
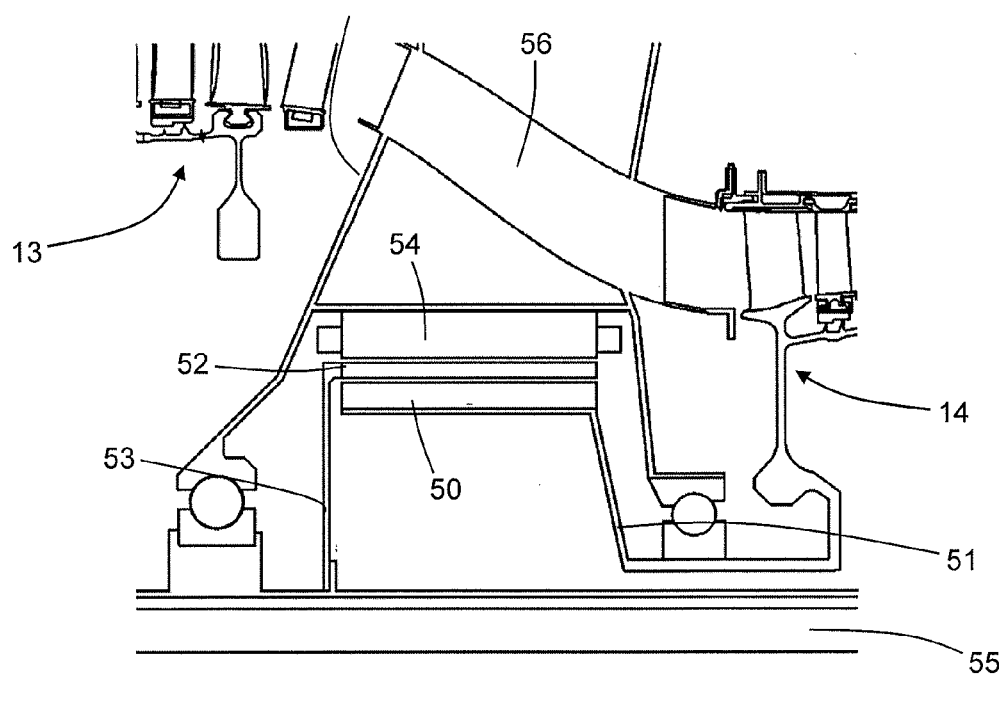
FIG. 4 illustrates schematically a coupling system located at position C in the engine of FIG. 1.

In the engine of FIG. 1, the system can be located at position C in order to transfer power between the intermediate-pressure and high-pressure spools. FIG. 4 illustrates schematically a typical installation of such a system. However, other suitable locations for a 3-shaft engine include the equivalent space between the intermediate-pressure and high-pressure turbines (for intermediate-pressure/high-pressure power transfer), or between the low-pressure and intermediate-pressure compressors or turbines (for low-pressure/intermediate-pressure power transfer). For a 2-shaft engine suitable locations are between the high-pressure and low-pressure compressors or turbines.

As shown in FIG. 4, a first (permanent magnet) rotor 50 which produces a first magnetic field is mounted on a mounting region 51 of the (higher speed) high-pressure spool, a second (interpole) rotor 52 is mounted on a mounting region 53 of the (lower speed) intermediate-pressure spool, and a stator 54 which carries electrical winding coils to generate a second magnetic field is rigidly mounted to the static engine structure 55. The coupling system is radially outwards of the low-pressure interconnecting shaft 56, and radially inwardly of the main gas path. In some cases it may be preferable to mount the first rotor on the lower speed spool and the second rotor on the higher speed spool—this depends on the relative spool speeds.

The electrical cables connected to the electrical winding coils of the stator 54 can be fed through the static engine structure, in a similar fashion to the radial driveshaft and fluid/gas pipework.

The spool speeds of the gas turbine are determined by turbomachinery, thermofluid and thermodynamic considerations, and are effectively external constraints on the coupling system. Thus, the rotational speed of the second magnetic field produced by the stator 54 can be controlled to match that dictated by the spool speeds and the relevant governing equation (Equation 8). This can be achieved by using a power electronic converter (not shown) to drive the stator winding current. Note that electrically the system is similar to a conventional brushless permanent magnet machine, and hence industry standard power converter technology and control techniques can be employed.

The flow of mechanical power between the spools can be controlled by controlling the electrical excitation of the stator winding coils. More particularly, to induce a transfer of power, the electrical excitation applied to the stator winding is determined, e.g. by controlling the magnitude of the phase current and its electrical phase difference angle relative to the phase EMF (this angle is often referred to as the "phase advance angle" or simply "gamma" in literature). Advantageously, the coupling system can be disengaged by open-circuiting the stator winding so that no current flows, and zero torque is transferred between the spools With suitable choice of pole pair and interpole numbers this control action results in the desired power flow from one spool to the other, with zero or minimal electrical power flow through the stator winding. Preferably the electrical winding has zero power flow through it (i.e. the second magnetic field produced by the stator 54 is stationary). However, since a magnetic gear can only offer a finite number of discrete gear ratios (due to the pole pair and interpole numbers being positive integers that are not too high in number to manufacture) and since the two rotor speeds are constrained by the spool speeds, there may be no pole pair and interpole number combination that results in zero outer rotor speed, although it is generally possible to approach zero. In these cases of non-zero stator "rotor" speed (where "speed" refers to the rotational speed of the stator magnetic field) the winding power flow is non-zero. The pole pair and interpole numbers are then preferably chosen to firstly minimise the electrical power flow required and secondly to result in electrical power flowing out of the coupling system (i.e. the system operating as an electrical generator) rather than into the system (i.e. the system operating as an electrical motor). The generated power can be exported to the wider engine 10 and/or aircraft electrical system. Generally, the optimum design for minimising the electrical power flow is that which achieves the minimum rotation speed for the magnetic field produced by the electrical winding. Therefore, the preferred value of $\alpha$ (see definition in Equation (1)) is derived using Equation (8), the two cases of interest being where the outer rotor speed is zero (the configuration of FIG. 2) and where the inner rotor speed is zero (the configuration of FIG. 3).

Thus, for the first case (zero outer rotor speed):

$$\alpha = \frac{\omega_{inner}}{\omega_{interpole}} - 1 \qquad \text{Equation (9)}$$

and for the second case (zero inner rotor speed):

$$\alpha = \frac{\omega_{interpole}}{\omega_{outer} - \omega_{interpole}} \qquad \text{Equation (10)}$$

With the preferred value of $\alpha$ determined using Equation (9) or (10), it is then possible to identify appropriate values for $p_{inner}$ and $p_{outer}$. Ideally they should yield exactly the value of $\alpha$ desired, but if this is not possible (due to constraints on maximum pole pair or interpole numbers, feasible winding configurations etc.) the closest feasible value can be used.

With contra-rotating engine spools it may be necessary to set the number of interpoles $\lambda$ to the difference between $p_{inner}$ and $p_{outer}$, rather than the sum, although the sum is generally preferable as it normally results in superior electromagnetic performance. However, the difference changes $\alpha$ to $-\alpha$ in the equations, which can help to locate feasible solutions to Equation (9) and Equation (10).

The permissible stator pole pair numbers may be further restricted to ensure good electromagnetic performance from the winding coils, and good manufacturability. This is particularly the case where a fractional slot (concentrated) winding is employed.

EXAMPLE

It is desired to transfer power from the intermediate-pressure spool of an engine to its high-pressure spool at the condition where the intermediate-pressure speed is 7000 rpm and the high-pressure speed is 17000 rpm. The spools counter-rotate. Due to the arrangement of the shafts in the engine, the outer stator configuration (FIG. 2) is preferred, with the inner rotor being connected to the high-pressure spool and the interpole rotor being connected to the intermediate-pressure spool, as shown in FIG. 4.

Equation (9) is applicable (since it is desired that the outer "rotor" be stationary). Hence, the preferred value for $\alpha$ is $(-17000/7000)-1=-24/7$ (noting that one speed is negative due to the counter-rotation of the spools).

Now, since $\alpha$ is negative, the configuration with the number of interpoles $\lambda$ as the difference between the inner and outer rotor pole pairs is appropriate, since this negates $\alpha$ and hence enables positive pole pair numbers (negative pole pair numbers are impossible). Thus, from Equation (1) $p_{outer}/p_{inner}$ should be set to $(-1)(-24/7)=24/7$, and clearly one solution is $p_{outer}=24$ and $p_{outer}=7$. In this case both pole pair numbers are feasible (i.e. the numbers are not too high and also a winding exists that can produce 24 pole pairs for the outer rotor). Hence at the design point the magnetic field from the stator winding will be stationary and all the power will pass from the IP spool to the HP spool without any power exporting/importing via the stator winding.

As the speed ratio between the gas turbine spools is generally relatively constant across most engine operating conditions for which power transfer may be required, and as the 3-way power flow split within the system is a function of the rotor speed ratios (see Equations (20) to (28) in the Appendix), the power split remains relatively constant across these engine operating conditions. This enables the system to be used for shaft power transfer at multiple engine operating points, i.e. multiple points of the aircraft flight cycle.

In the above example, the coupling system is used to transfer power between the two spools. However, another option is to use the system to extract power from the spools. The configuration shown in FIG. 4 can still be adopted, with the first (permanent magnet) rotor 52 producing a magnetic field mounted on the higher speed spool, the second (interpole) rotor 53 mounted on the lower speed spool to modulate the magnetic field, and the stator 54 carrying electrical winding coils. In this case, however, the coils are arranged to transduce the modulated magnetic field into electrical energy. The stator winding can again be connected to a power converter (not shown) to control the current waveform.

For a selected level of extracted power, a desired value of $P_{interpole}/P_{inner}$ is determined in order to set the power split between the two spools. The pole pair and interpole numbers can then be selected so as to minimise the absolute error between the actual $P_{interpole}/P_{inner}$ and the desired $P_{interpole}/P_{inner}$. The minimisation can be performed over a number of spool speeds representing various engine operating conditions, and then the optimal pole pair and interpole numbers selected based on the outcome of all the minimisations. The minimisation is also subject to the following constraints:

Interpole number is set to sum or difference of $p_{inner}$ and $p_{outer}$ $\omega_{inner}$=1st spool speed (the high-pressure spool speed in FIG. 4)

$\omega_{interpole}$=2nd spool speed (the intermediate-pressure spool speed in FIG. 4)

$1<=p_{inner}<=$maximum feasible pole pair number (typically determined by manufacturability considerations)

$1<=p_{outer}<=$maximum feasible pole pair number (typically determined by manufacturability considerations)

Power flow direction for inner and interpole rotors is opposite to that of outer rotor Stator electrical frequency<=maximum feasible electrical frequency (typically determined by the maximum electrical switching frequency in the power converter)

Locating the coupling system between the high-pressure and low-pressure spools in a 2-shaft engine or between the high-pressure and intermediate-pressure spools in a 3-shaft engine can conflict with the location of the radial driveshaft of the engine. However, it may be possible to avoid this problem by deleting the gearing and drive shaft arrangement for extracting power from the high-pressure spool and relying instead on such a coupling system accessory power generation. Indeed, two such coupling systems can be installed, one configured (e.g. by suitable selection of pole pair and interpole numbers) for power extraction from the spools and one configured for power transfer between the spools. The systems can be axially adjacent within the engine and can utilise the same spool mountings etc.

Another option is to replace the first rotor and its permanent magnets with a conventional salient or non-salient rotor with a DC winding, current being supplied via sliprings or a brushless exciter. This enables the excitation to be controlled in the same manner as wound field synchronous machines, and thus output voltage control can be implemented.

With the ability to provide voltage control, the stator winding can directly feed the aircraft electrical system without the need for an intermediate power converter. Suitable selection of pole pair and interpole numbers can ensure both desirable machine power flow splits (i.e. power extraction from two spools and electrical power generation in the stator winding) and that the frequency range of the stator winding remains within acceptable upper and lower bounds (e.g. 360-800 Hz for present aerospace certification standards).

While the invention has been described in conjunction with the exemplary embodiments described above, many equivalent modifications and variations will be apparent to those skilled in the art when given this disclosure. For example, although a radial flux topology is described above, the coupling system could have an axial flux topology. Accordingly, the exemplary embodiments of the invention set forth above are considered to be illustrative and not limiting. Various changes to the described embodiments may be made without departing from the spirit and scope of the invention.

All references referred to above are hereby incorporated by reference.

APPENDIX

The following equations are derived from Equations (3) to (8).

Derived Relationships for Speed $\omega_{inner}$ in terms of $\omega_{interpole}$ and $\omega_{outer}$ $$\omega_{inner}=\omega_{interpole}(1+\alpha)-\alpha\omega_{outer} \qquad \text{Equation (11)}$$

$\omega_{interpole}$ in terms of $\omega_{inner}$ and $\omega_{outer}$ $$\omega_{interpole} = \frac{\omega_{inner} + \alpha\omega_{outer}}{1+\alpha} \qquad \text{Equation (12)}$$

$\omega_{outer}$ in terms of $\omega_{inner}$ and $\omega_{interpole}$ $$\omega_{outer} = \frac{\omega_{interpole}(1+\alpha) - \omega_{inner}}{\alpha} \quad \text{Equation (13)}$$

Derived Relationships for Torque
Specify $T_{inner}$ $$T_{interpole} = -T_{inner}(1+\alpha) \quad \text{Equation (14)}$$

$$T_{outer} = \alpha T_{inner} \quad \text{Equation (15)}$$

Specify $T_{interpole}$ $$T_{inner} = \frac{-T_{interpole}}{1+\alpha} \quad \text{Equation (16)}$$

$$T_{outer} = \frac{-T_{interpole}\alpha}{1+\alpha} \quad \text{Equation (17)}$$

Specify $T_{outer}$ $$T_{inner} = \frac{T_{outer}}{\alpha} \quad \text{Equation (18)}$$

$$T_{interpole} = \frac{-T_{outer}(1+\alpha)}{\alpha} \quad \text{Equation (19)}$$

Derived Relationships for Power
Specify $P_{inner}$ $$P_{interpole} = -P_{inner}\left(1 + \alpha\frac{\omega_{outer}}{\omega_{inner}}\right) \quad \text{Equation (20)}$$

$$P_{interpole} = -P_{inner}(1+\alpha)\frac{\omega_{interpole}}{\omega_{inner}} \quad \text{Equation (21)}$$

$$P_{outer} = P_{inner}\alpha\frac{\omega_{outer}}{\omega_{inner}} \quad \text{Equation (22)}$$

Specify $P_{interpole}$ $$P_{inner} = P_{interpole}\left(\frac{\omega_{outer}}{\omega_{interpole}}\frac{\alpha}{(1+\alpha)} - 1\right) \quad \text{Equation (23)}$$

$$P_{inner} = -P_{interpole}\left(\frac{\omega_{inner}}{(1+\alpha)\omega_{interpole}}\right) \quad \text{Equation (24)}$$

$$P_{outer} = -P_{interpole}\frac{\alpha\omega_{outer}}{\alpha\omega_{outer} + \omega_{inner}} \quad \text{Equation (25)}$$

$$P_{outer} = -P_{interpole}\frac{\omega_{outer}}{\omega_{interpole}}\frac{\alpha}{(1+\alpha)} \quad \text{Equation (26)}$$

Specify $P_{outer}$ $$P_{inner} = P_{outer}\frac{\omega_{inner}}{\omega_{outer}}\frac{1}{\alpha} \quad \text{Equation (27)}$$

$$P_{interpole} = -P_{outer}\left(1 + \frac{\omega_{innter}}{\omega_{outer}}\frac{1}{\alpha}\right) \quad \text{Equation (28)}$$

The invention claimed is:

1. An electro-magnetic coupling system for transferring torque between a pair of coaxial spools of a gas turbine engine, the system including a first rotor rotatable with one of the spools, a second rotor rotatable with the other of the spools, and a stator, the first and second rotors and the stator being coaxial with each other, and the second rotor operably coupling the first rotor and the stator;
wherein:
the first rotor carries a plurality of magnetic flux-producing formations which produce a first magnetic field,
the stator carries a plurality of electrical winding coils which are energisable to generate a second magnetic field, and
the second rotor carries an arrangement of interpoles which modulate the first and second magnetic fields such that the modulated fields interact to transfer torque between the spools.

2. A system according to claim 1, wherein the electrical winding coils of the stator are de-energisable to remove the second magnetic field, and the system is configured such that, in the absence of the second magnetic field, there is no torque transfer between the spools.

3. A system according to claim 1, wherein the second rotor has a substantially constant speed ratio relative to the first rotor during predetermined operating conditions of the engine, and the number of magnetic flux-producing formations of the first rotor and the number of interpoles of the second rotor are selected such that, at the constant speed ratio, the electrical power flow through the electrical winding coils of the stator is zero.

4. A system according to claim 1, wherein the second rotor has a substantially constant speed ratio relative to the first rotor during predetermined operating conditions of the engine, and the number of magnetic flux-producing formations of the first rotor and the number of interpoles of the second rotor are selected such that, at the constant speed ratio, the electrical power flow through the electrical winding coils of the stator is minimized.

5. A system according to claim 1, wherein the magnetic flux-producing formations of the first rotor are permanent magnets.

6. A system according to claim 1, wherein the magnetic flux-producing formations of the first rotor are further electrical winding coils.

7. A system according to claim 1, wherein the first rotor is radially spaced from the stator, and the second rotor is radially located between the first rotor and the stator.

8. A system according to claim 7, wherein the stator is radially outward of the first rotor.

9. A system according to claim 1, wherein the first rotor is axially spaced from the stator, and the second rotor is axially located between the first rotor and the stator.

10. An electro-magnetic coupling system for generating electrical power from a pair of coaxial spools of a gas turbine engine, the system including a first rotor rotatable with one of the spools, a second rotor rotatable with the other of the spools, and a stator, the first and second rotors and the stator being coaxial with each other, and the second rotor operably coupling the first rotor and the stator;
wherein:
the first rotor carries a plurality of magnetic flux-producing formations which produce a magnetic field,
the second rotor carries an arrangement of interpoles which modulate the magnetic field, and
the stator carries a plurality of electrical winding coils which are arranged to transduce the modulated magnetic field into electrical energy.

11. A system according to claim 10, wherein the magnetic flux-producing formations of the first rotor are permanent magnets.

12. A system according to claim 10, wherein the magnetic flux-producing formations of the first rotor are further electrical winding coils.

13. A system according to claim 10, wherein the first rotor is radially spaced from the stator, and the second rotor is radially located between the first rotor and the stator.

14. A system according to claim 13, wherein the stator is radially outward of the first rotor.

15. A system according to claim 10, wherein the first rotor is axially spaced from the stator, and the second rotor is axially located between the first rotor and the stator.

16. A gas turbine engine having at least two coaxial spools, the engine further having an electro-magnetic coupling system for transferring torque between the spools according to claim 1.

17. A gas turbine engine having at least a two coaxial spools, the engine further having an electro-magnetic coupling system for transferring torque between the spools according to claim 10.

* * * * *